United States Patent [19]

Simon et al.

[11] Patent Number: 5,995,281
[45] Date of Patent: Nov. 30, 1999

[54] DEVICE FOR COUPLING THE RADIATION OF SHORT-PULSE LASERS IN AN OPTICAL BEAM PATH OF A MICROSCOPE

[75] Inventors: Ulrich Simon, Jena; Ralf Wolleschensky, Schoeten, both of Germany

[73] Assignee: Carl Zeiss Jena GmbH, Jena, Germany

[21] Appl. No.: 08/947,587

[22] Filed: Oct. 9, 1997

Related U.S. Application Data

[63] Continuation-in-part of application No. 08/826,906, Apr. 9, 1997.

[30] Foreign Application Priority Data

Oct. 8, 1997 [DE] Germany .............................. 197 44 302

[51] Int. Cl.$^6$ .............................. G02B 21/06; G02B 6/26
[52] U.S. Cl. .............................. 359/368; 359/385; 385/31; 385/37
[58] Field of Search ..................................... 356/368–369, 356/385–389, 558–568, 318, 326; 385/31–27, 147; 372/5–6, 100, 102; 250/458.1, 459.1, 461.1

[56] References Cited

U.S. PATENT DOCUMENTS

| 5,034,613 | 7/1991 | Denk et al. | 356/318 |
| 5,101,456 | 3/1992 | Islam | 385/37 |
| 5,132,526 | 7/1992 | Iwasaki | 359/368 |
| 5,161,053 | 11/1992 | Dabbs | 359/384 |
| 5,835,263 | 11/1998 | Dobschal | 359/368 |

*Primary Examiner*—Thong Nguyen
*Attorney, Agent, or Firm*—McAulay Nissen Goldberg Kiel & Hand, LLP

[57] ABSTRACT

A device for coupling in the radiation from short-pulse lasers into a beam path of a microscope provides that the coupling in is effected by at least one light conducting fiber following the laser. In particular, the device is directed to the coupling in of short-pulse lasers with pulse durations in picoseconds to femtoseconds in a laser scanning microscope by light conducting fibers.

6 Claims, 9 Drawing Sheets

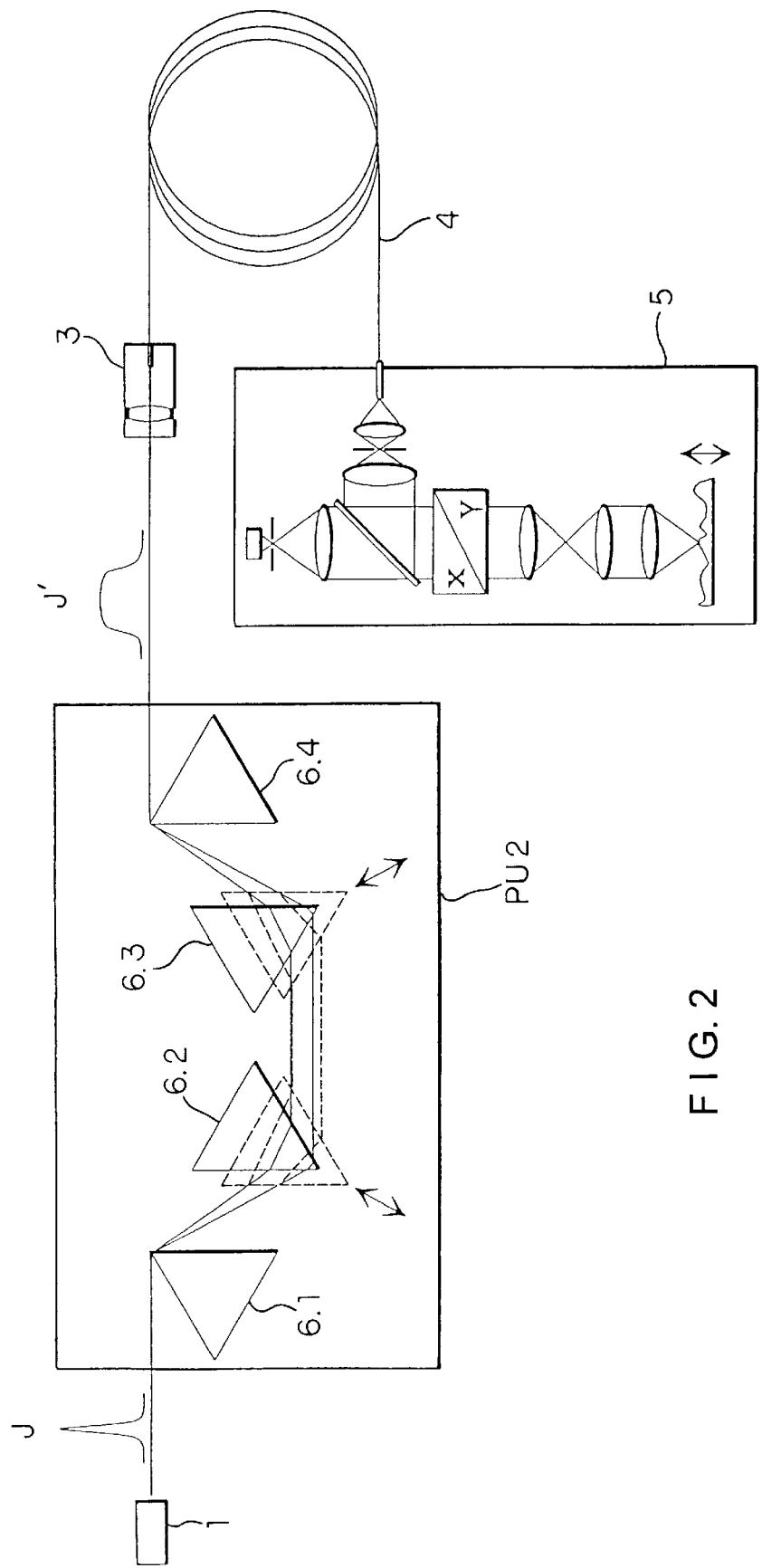
F I G. 2

$$d(\sin\alpha + \sin\beta) = m\lambda$$

d: GRATING PERIOD
m: ORDER NUMBER
λ: WAVELENGTH
α: INCIDENT ANGLE
β: ANGLE OF DIFFRACTION

DEVICE FOR COUPLING THE RADIATION OF SHORT-PULSE LASERS IN AN OPTICAL BEAM PATH OF A MICROSCOPE

CROSS-REFERENCE TO RELATED APPLICATION

The invention is an application for a patent of addition to Application DE 19622359.8 of Jun. 4, 1997 in Germany and a continuation-in-part application to U.S. Ser. No. 08/826,906, filed on Apr. 9, 1997, in the United States.

BACKGROUND OF THE INVENTION a) Field of the Invention

The invention describes a compact unit for changing the chirp state (temporal sequence of spectral components) of short laser pulses.

b) Description of the Related Art

The use of short-pulse lasers in two-photon laser microscopy is known from U.S. Pat. No. 5,034,613. The coupling of light from a laser light source into a confocal scanning beam path via light-conducting fibers is known, per se, from U.S. Pat. No. 5,161,053.

Generally, short pulses undergo a change in (including a lengthening of) their pulse duration when passing through dispersive media due to the phenomenon of group velocity dispersion (GVD). In addition, nonlinear optical phenomena (e.g., self-pulse modulation, Brillouin scattering, Raman scattering, etc.) which affect the spectral composition of short pulses can attain practical relevance in the dispersive medium due to the high pulse peak outputs and pulse intensities which go along with short pulses.

It is suggested in "Handbook of biological confocal microscopy", pages 447, 448, to compensate for the GVD in optical glass by means of prism arrangements or grating arrangements. However, it is questionable whether this brings about any improvement in view of the complex adjustment problems and wasted energy.

OBJECT AND SUMMARY OF THE INVENTION

The primary object of the invention is an advantageous coupling of short-pulse lasers, e.g., in two-photon microscopy, into the microscope beam path, in particular into the beam path of a laser scanning microscope.

In accordance with the invention, a device for coupling in the radiation from short-pulse lasers into a beam path of a microscope provides that the coupling in is effected by at least one light-conducting fiber following the laser.

The invention is directed in particular to the coupling in of short-pulse lasers (pulse durations in picoseconds to femtoseconds) in a laser scanning microscope by means of light-conducting fibers.

The invention will be described more fully hereinafter with reference to the schematic drawings.

BRIEF DESCRIPTION OF THE DRAWINGS

In the drawings:

FIG. 2 shows coupling in via a plurality of prisms;

DESCRIPTION OF THE PREFERRED EMBODIMENTS

Figure 1:
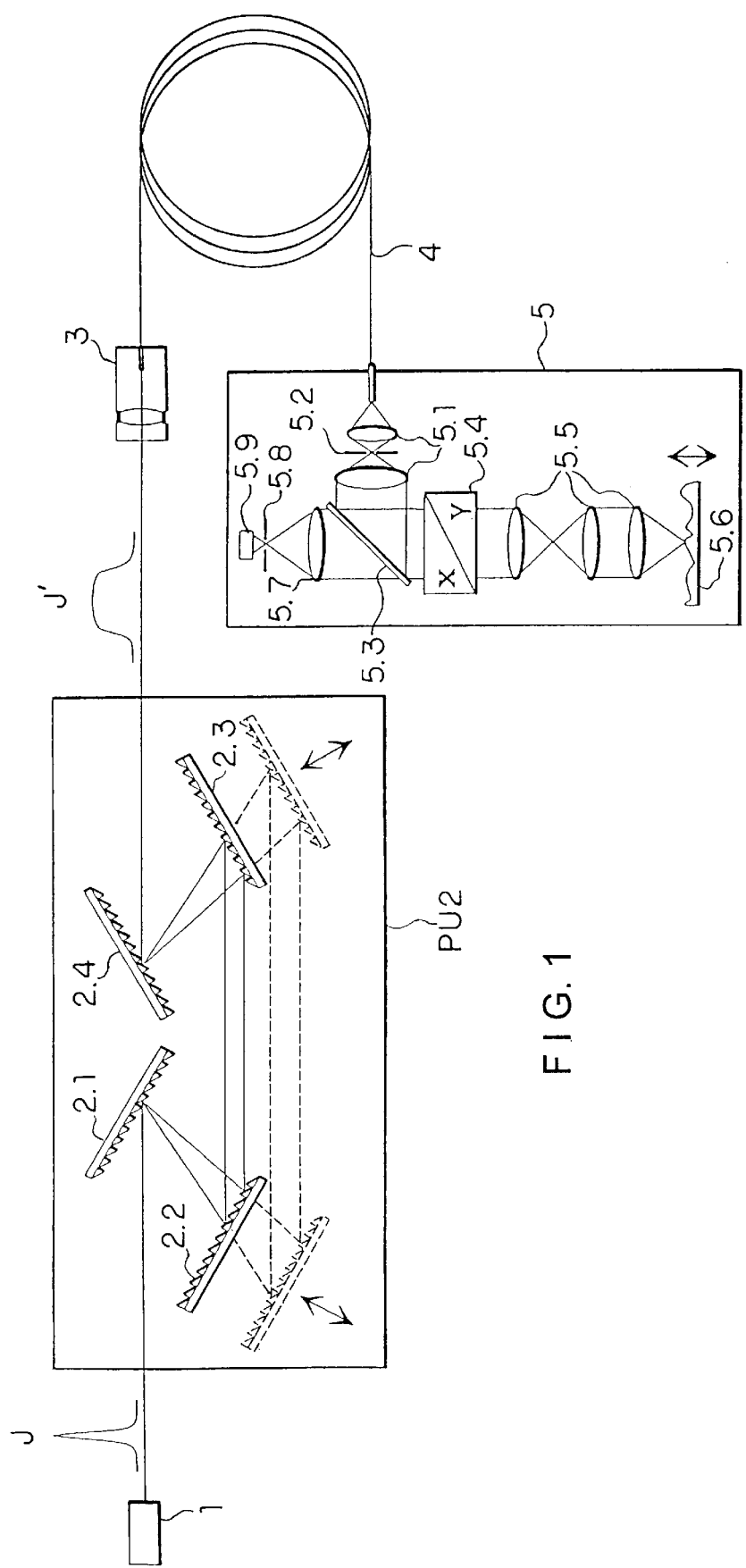
FIG. 1 shows coupling in via a plurality of gratings.

It is possible to use short-pulse lasers as an excitation source, preferably in two-photon microscopy and time-resolved and spatially-resolved microscopy, wherein these techniques benefit from all of the advantages of fiber coupling such as high flexibility in optical design, highly stable laser beam direction, and good laser beam quality, particularly for coupling in monomode fiber systems. In particular, the invention advantageously prepares the pulses before they enter the light-conducting fiber in such a way that the pulse shape and pulse length in the specimen to be examined practically correspond to those at the laser output. In this way, the advantages of using short pulses can be combined with the advantages of using light-conducting fibers. In order to counteract differences in transit time between the various spectral components of the short pulses through the dispersive media (including the light-conducting fiber), an optical device is used which can compensate for the GVD and the high-order dispersion of the optical system overall. This device provides for a time lead for the slower spectral components of the short pulses by means of shortened optical paths effective for these components. As is shown in the embodiment example, the technical realization of this device can comprise prism arrangements or grating arrangements or a combination of the two, or combinations with reflecting elements. Accordingly, a sufficient amount of negative GVD is applied to the short pulses before entry in the light-conducting fiber, so that they regain their original pulse shape in the specimen after passing through the fiber and the rest of the optical system.

As a result of the negative GVD applied to the pulses by means of a suitable pre-chirping unit at the input of the light-conducting fiber, the short pulses are widened with respect to time to such an extent that the pulse-peak outputs and intensities within the light-conducting fiber are below the critical values for the occurrence of nonlinear phenomena. Accordingly, it is ensured that the short pulses, although changing shape with respect to time, will not change in spectral composition when passing through the light-conducting fiber.

In an advantageous manner, the self-phase modulation described with respect to optical pulse compression in "Laser Spectroscopy", W. Demtröder, Springer-Verlag 1991, pp. 418 ff., will therefore not occur.

Especially when using monomode light-conducting fibers, the spatial beam profile of the laser radiation in the specimen can be improved over that at the laser output of the excitation laser due to the spatial filtering effect of the fiber. This is particularly advantageous in techniques such as two-photon microscopy, since a clean laser beam profile is a compulsory requirement for good focussing capability of the excitation beam and the high two-photon excitation probability resulting therefrom. Other lasers can also be coupled into the laser scanning microscope simultaneously by means of the same light-conducting fiber used for transmitting the short pulses. Accordingly, the same object point can be irradiated by a plurality of lasers simultaneously or successively. The use of monomode light-conducting fibers or multimode light-conducting fibers in connection with subsequent diffraction-limited focussing through an aperture for spatial filtering of the excitation laser beam profile in connection with short-pulse lasers enables an improved focussing capability of the excitation laser beam and accordingly a higher spatial resolution and also two-photon excitation probability. An improvement is achieved in the beam direction stability in connection with short-pulse lasers. In particular, this allows the generally complex and adjustment-intensive short-pulse laser to be optimized without the need for readjustment of the laser scanning microscope.

After the short-pulse laser is optimized, it is only necessary to maximize the coupling efficiency in the light-conducting fiber; however, the beam path within the microscope remains unchanged.

The unit according to the invention is distinguished in particular by an especially compact type of construction through the use of an individual grating (instead of the two to four gratings which are normally used for this purpose). Accordingly, aside from a compact and thus especially stable optical construction, a simple adjustment of the unit is ensured in particular. In this construction, it is possible to adapt to wavelength or to change the dispersion advantageously through the adjustment of a single degree of freedom. For example, the unit enables modification of the chirp of a short laser pulse in such a way that the laser pulse can be advantageously transmitted, e.g., through a dispersive optical system such as a fiber transmission system, without irreversible changes in the spectral composition of the laser pulse. This advantageously enables the transporting of short laser pulses to any location in a flexible manner.

Referring now to the drawings, in FIG. 1, the light from a short-pulse laser light source 1, e.g., a titanium-sapphire laser with pulse durations in the order of magnitude of approximately 100 fs or a laser with pulse durations in the ps range, enters a pre-chirping unit PU 2 which, in the present case, comprises four gratings 2.1, 2.2, 2.3, 2.4. An individual pulse I is shown by way of example. By means of wavelength-dependent diffraction at the first grating 2.1 and after collimation at grating 2.2 and the restoring of the beam ratios with respect to beam diameter and parallelism by means of gratings 2.3, 2.4, the blue light component gains a lead in time over the red light component. The laser pulses I' which are broadened with respect to time in this way enter, by way of an input coupling element 3 and a monomode fiber 4, into the beam path of a confocal scanning microscope 5 which is indicated schematically herein by output coupling optics 5.1 with pinhole 5.2, semitransparent mirror 5.3, an X/Y scanning unit 5.4, imaging optics 5.5, specimen 5.6, imaging optics 5.7, pinhole 5.8, and detector 5.9. In FIG. 2, four prisms 6.1, 6.2, 6.3, 6.4 are provided in place of the gratings 2.1–2.4 in the PU 2, these prisms 6.1–6.4 effecting a spectral division analogous to the gratings 2.1–2.4 with subsequent collimation and beam recombination. Instead of the four gratings or prisms provided here, an arrangement, not shown, of only two gratings or two prisms and a mirror can also be selected, the beam being turned back on its course after reflection at the mirror so that it passes twice through the grating combination or prism combination. Further, a multiple passage through the PU 2 can be effected by using a plurality of mirrors.

Figure 3:
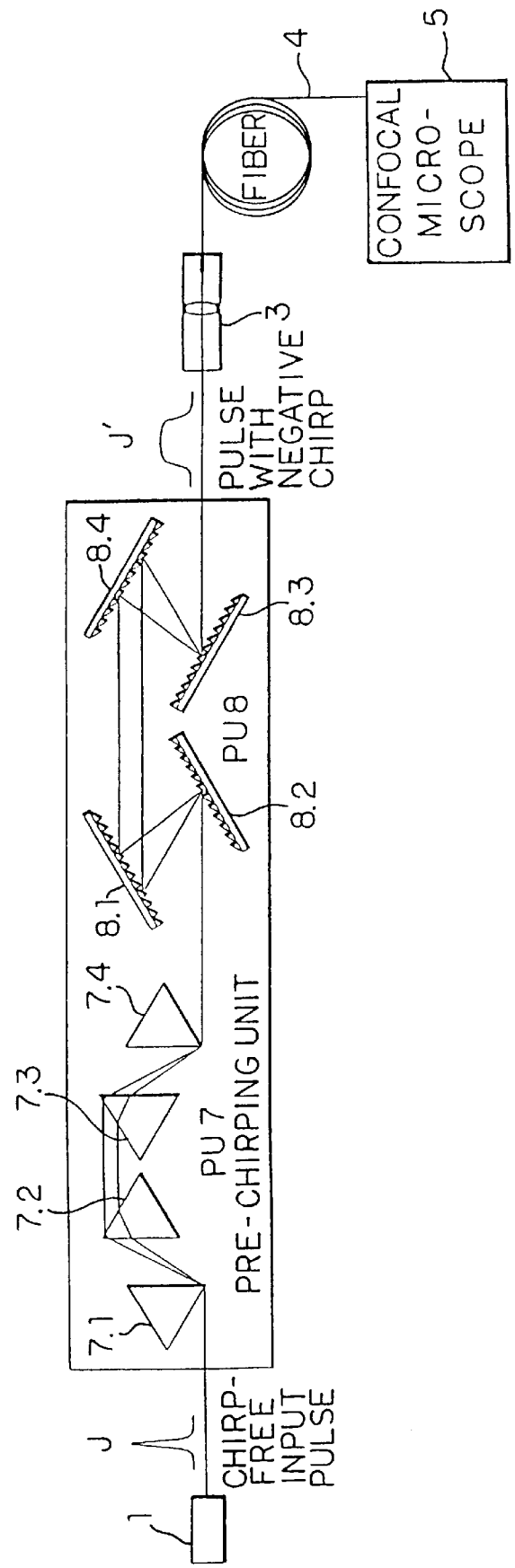
FIG. 3 shows coupling in via gratings and prisms.

In FIG. 3, the aimed for effect is further increased by combining a PU 7 comprising prisms 7.1–7.4 with a PU 8 comprising gratings 8.1–8.4.

Higher-order dispersion effects can also be compensated for in this case in particular as is described with respect to optical pulse compression ("Laser Spectroscopy", W. Demtröder, Springer-Verlag 1991, pp. 418 ff).

By increasing the distance of gratings 2.1, 2.4 from gratings 2.2, 2.3 and the distance of prisms 6.1, 6.4 from prisms 6.2, 6.3 by means of the displacement of elements 2.2; 2.3 and 6.2; 6.3 along the direction indicated by the arrows, as is shown schematically in FIGS. 1 and 2, the spectral path differences are increased in an adjustable manner or are decreased by reducing the distance. A second position of the gratings 2.2; 2.3 and prisms 6.2; 6.3 is shown by way of example in dashed lines.

Accordingly, it is possible to adjust the pulse width so as to specifically compensate not only for the differences in transit time caused by the light-conducting fiber, but also, beyond this, for differences in transit time caused by further dispersive media, especially in the beam path of the confocal microscope, e.g., objectives, especially those with a high numerical aperture, the scanning objective, tube lens, and other optical elements made from glass.

The displacement of the gratings or prisms along the direction indicated by the arrows can be effected manually or by electrical control by means of known steps familiar to the person skilled in the art and not shown herein.

Figure 4:
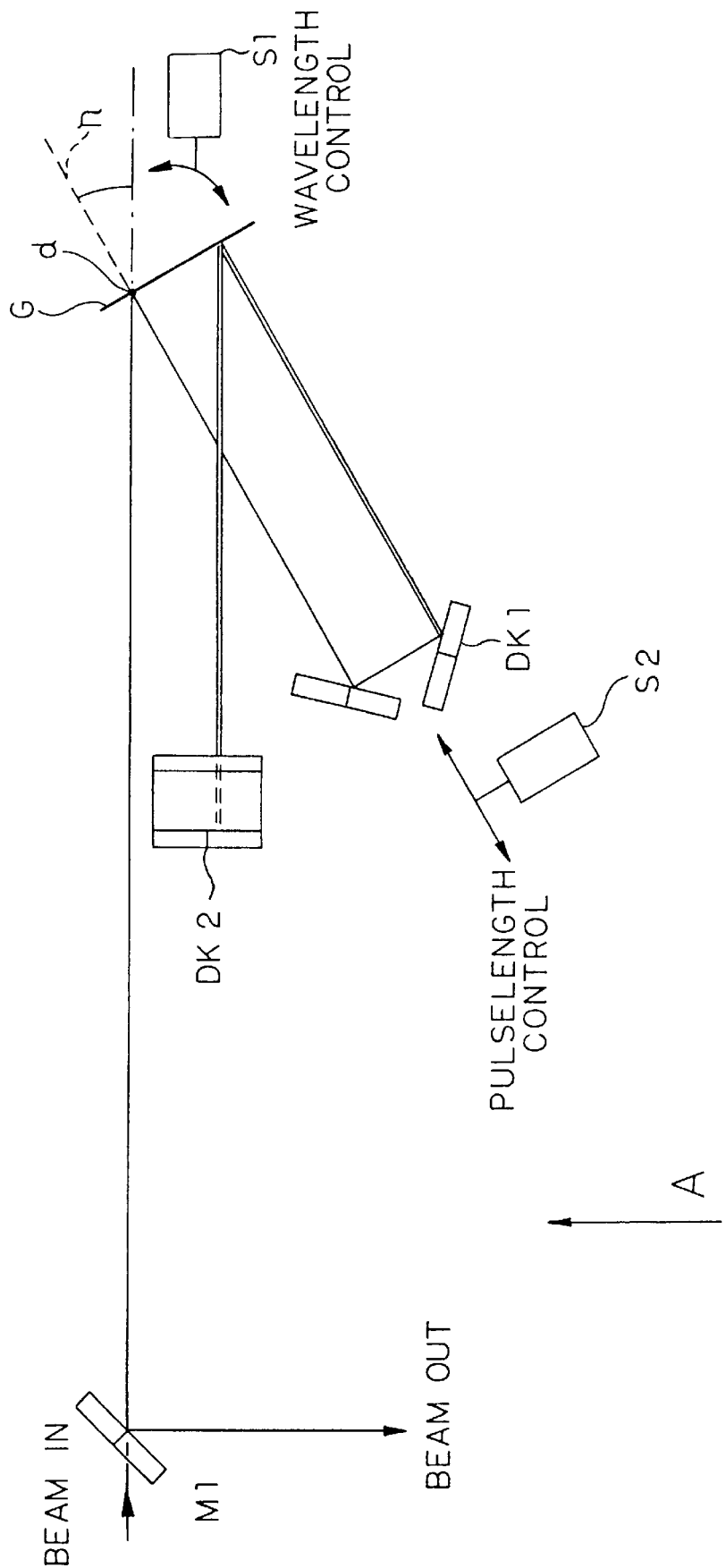
FIG. 4 is a top view of the beam configuration in an advantageous pre-chirping unit PU.
Figure 5:
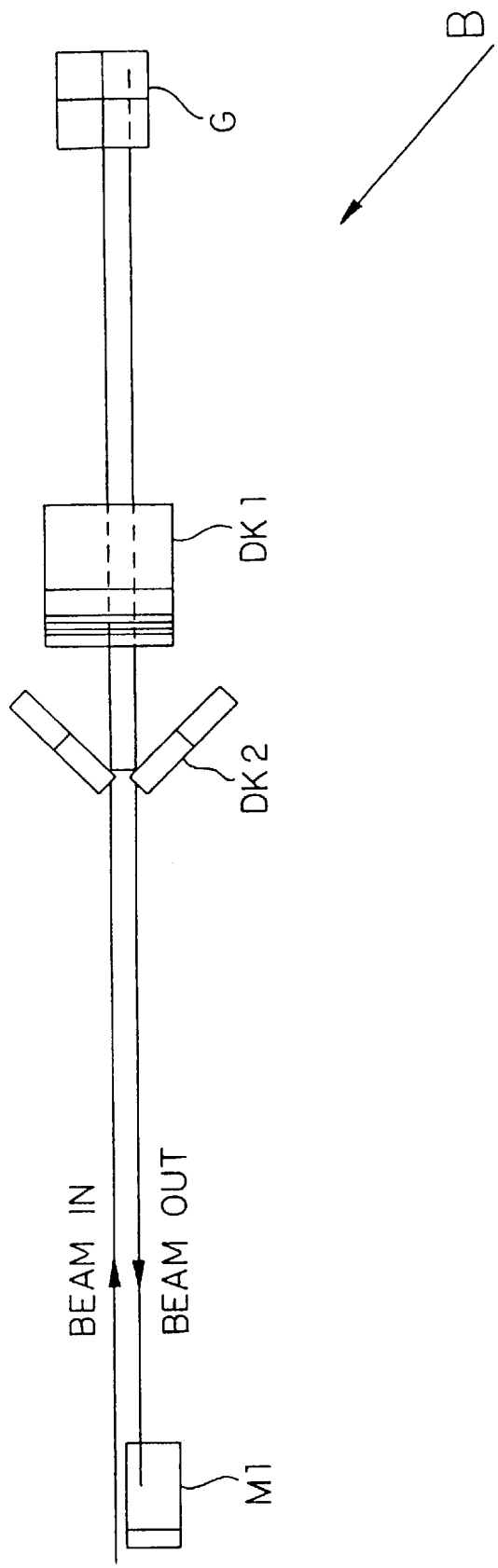
FIG. 5 is a side view from direction A in FIG. 4.
Figure 6:
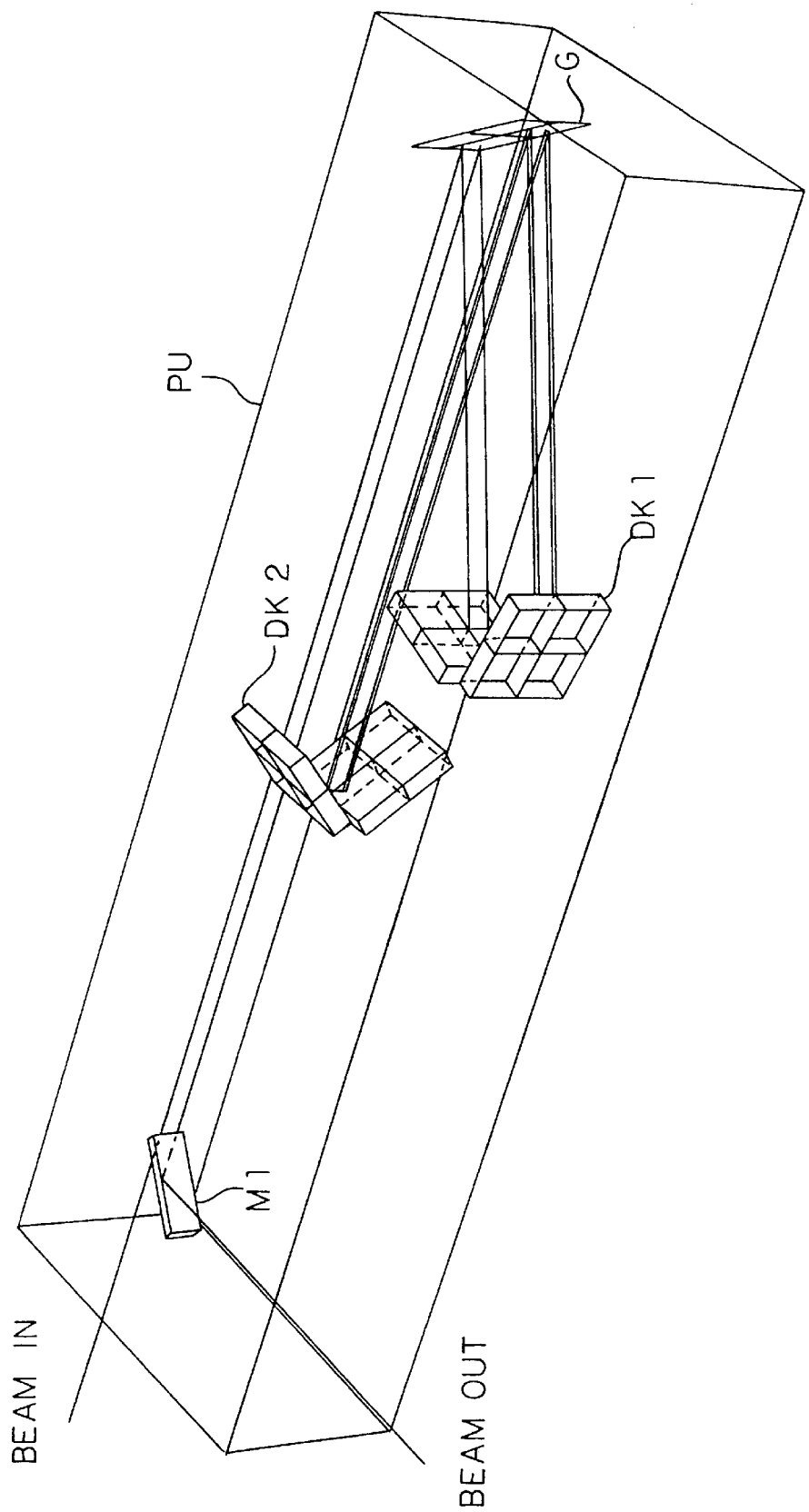
FIG. 6 is an oblique view from direction B in FIG. 5.
Figure 7:
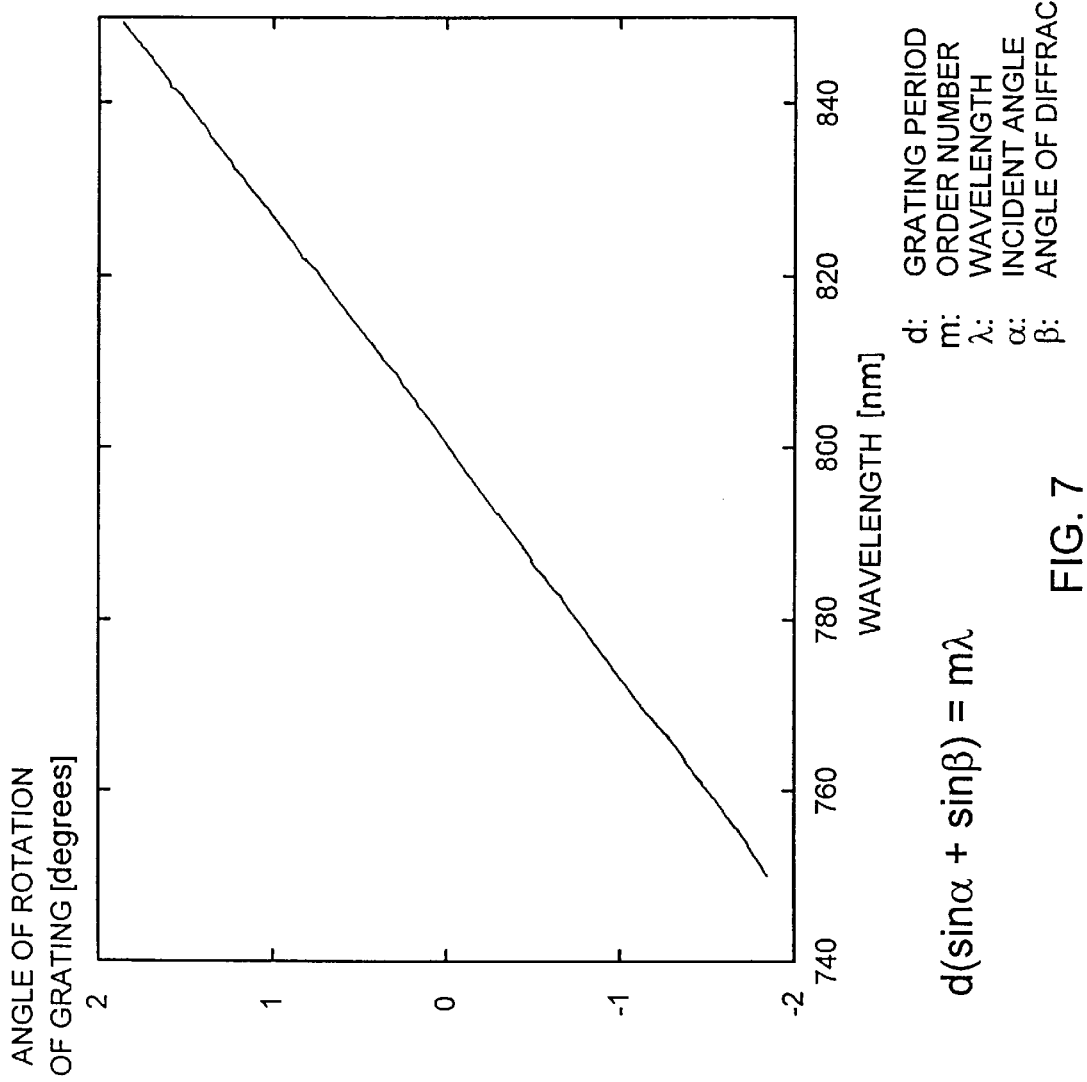
FIG. 7 is a graphic representation of the grating equation, i.e., the dependence of the grating diffraction angle β on the incident angle α, on the wavelength of the laser beam I, on the grating period d, and on the order of diffraction m.

The invention, in accordance with FIGS. 4 to 9, comprises an incident short laser pulse (beam in), means PU for dispersion of the laser pulse, and an exiting laser pulse (beam out). An embodiment form of the construction according to the invention is shown schematically in FIGS. 4 to 6. FIGS. 8a and 8b show a comparison of the unit, according to the invention, for arrangements with four prisms. With reference to FIGS. 4 to 6, the entering short laser pulse (beam in) impinges on an optical grating (G), in this case a reflection grating. The normal n of the grating is at an angle $\alpha$ to the direction of the entering laser beam. The Fourier theorem states that there must be a determined spectral composition in the frequency domain or frequency space which corresponds to the entering laser pulse. As a result of the dispersive effect of the grating, the entering laser pulse is broken up into its spectral components in accordance with the grating equation $d(\sin \alpha + \sin \beta) = m\lambda$, where d is the grating period, m is the order number, $\lambda$ is the wavelength, $\alpha$ is the incident angle, and $\beta$ is the angle of diffraction. This is represented in FIG. 7. Due to the use of a blazed grating, only diffraction of the first order occurs.

The divergent laser beam which is modified in this way is deflected in the direction of a horizontally arranged reflector system DK1 comprising two mirrors arranged vertically to one another, preferably plane mirrors forming a roof mirror system. This roof system reflects the laser beam back to the grating at the same beam level, i.e., in a plane with and in the same direction (angle a) to the grating. By using a reflector of this type it is advantageously ensured that the grating is struck by the laser beam during each of the two passes at the same angle of incidence.

Only under these circumstances is it ensured that an entering laser beam which is symmetric with respect to rotation around the optical axis will still possess a rotationally symmetric beam profile after twice passing through the grating. Moreover, it is of decisive importance for the functioning of the construction, in accordance with the invention, that the sequence of the spectral configuration is reversed when reflected at the retro-reflector system DK1 (a simple mirroring of the spectrally broadened laser beam does not lead to the same result). The grating is preferably blazed so that only the first order of the beam deflection is used. After travelling twice through the grating, the laser beam is now formed of a parallel laser beam bundle whose wavelength changes continuously from red to blue over the beam cross section. This parallel laser beam bundle impinges on a second reflector system DK2 arranged vertical to DK1, and again on a roof mirror system which reflects the beam bundle again at an angle a in the direction of the grating, but in a plane that is situated lower with respect to the grating G.

The beam path described above is repeated with two further passes through the grating G on the lower plane so that, after a total of four passes of the laser beam through the grating G, the input beam (beam in) is now coupled out by way of deflecting mirror M1 and is available as an output beam (beam out) at the output of the unit according to the invention, but with negative dispersion applied by the unit and in a lower plane.

Figure 8A:
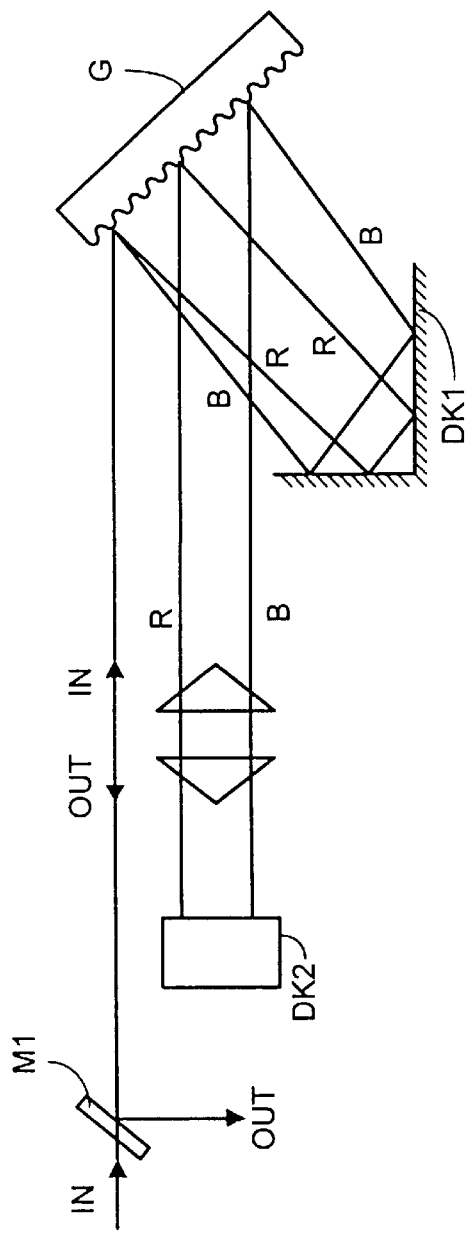
FIG. 8a) shows the arrangement, according to FIG. 4, with a beam configuration shown by way of example for red wavelengths R and blue wavelengths B.
Figure 8B:
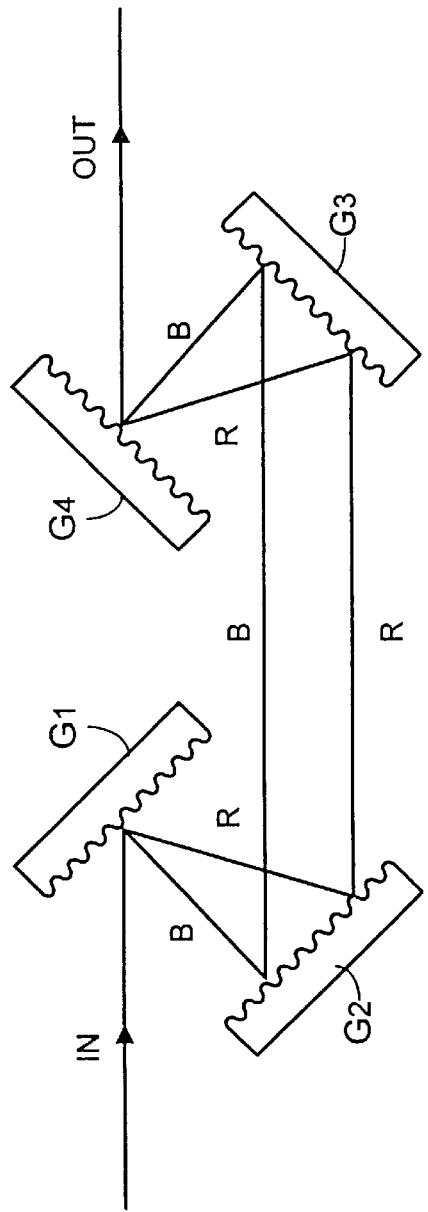
FIG. 8b) shows an arrangement, according to FIG. 1, with four gratings G1–G4 and wavelengths R and B.
Figure 9:
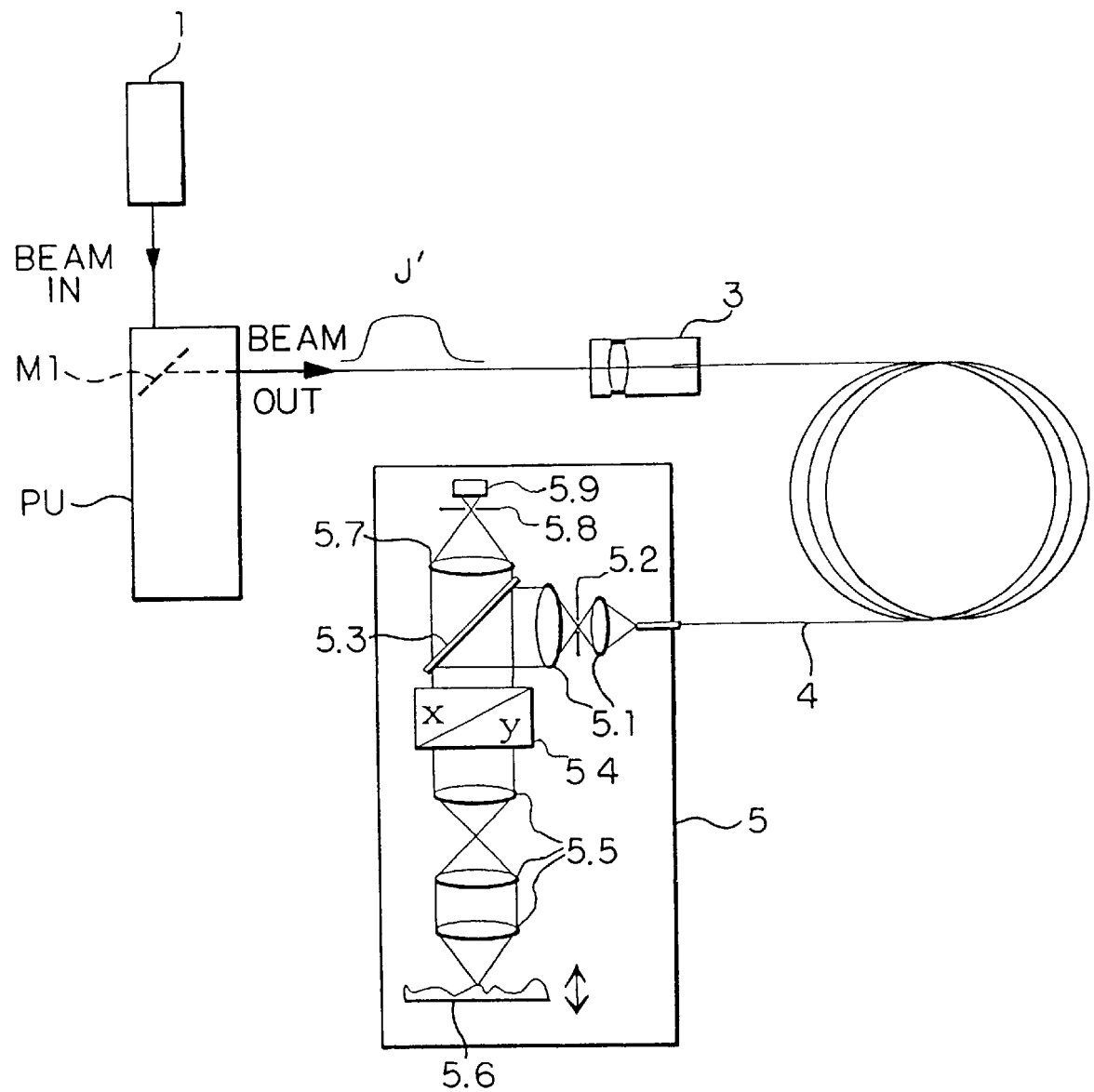
FIG. 9 shows the integration of a unit PU, according to FIGS. 4 to 6, in a laser scanning microscope.

This unit accordingly constitutes a highly compact embodiment form of a conventional pre-chirp unit which, according to FIG. 1, comprises four individual gratings G1, G2, G3 and G4 (see comparison with red and blue wavelengths in FIGS. 8a and 8b). Whereas in the arrangement with multiple gratings the individual gratings must be adapted to one another in a cumbersome manner, the adjustment in the unit according to the invention with only one grating is entirely uncritical. Moreover, the unit according to the invention is appreciably more compact and accordingly more stable than the four-grating arrangement.

The coupling in of the beam (beam in) and the coupling out of the beam (beam out) with respect to the beam path shown in FIGS. 1 to 3 from the laser light source 1 in the direction of the light-conducting fiber 4 is modified compared with FIGS. 1 to 3 in such a way that the PU according to FIGS. 4 to 6 is arranged between the laser source 1 and the input coupling unit 3.

An arrangement of the type mentioned above is shown schematically in FIG. 9, wherein only the deflecting mirror M1 is shown. In contrast to FIGS. 1 to 3, the beam in and beam out are at right angles to one another.

One grating G1, as a component part of the unit PU, according to the invention, is shown by way of example in FIG. 4, wherein the grating G1 is mounted so as to be rotatable via a control unit S1 or by hand about a center of rotation d vertical to the drawing plane formed by the intersection of the entering beam and the grating surface. Exclusively by rotating the grating about this axis (which axis lies perpendicular to the beam plane, the center of rotation described above running through this axis) by angle a, the unit, in accordance with the grating equation (FIG. 7), can be optimized on a determined wavelength $l_0$ of the Fourier spectrum without needing to move another optical component. This is important when changing the wavelength of the beamed in laser in order to adjust the system with respect to the retro-reflectors DK1 and DK2.

By suitable selection of the grating and grating efficiency, the arrangement can be sufficiently insensitive to wavelength so that the arrangement can be advantageously used without difficulty over a wide wavelength range of several hundred nm when the grating efficiency is selected in such a way that the efficiency of the grating does not change within the wavelength range.

The center of rotation d is the point about which the grating (G) must be rotated for adapting to the wavelength. In this connection, the rotating movement can be transmitted to the grating by a translatory movement via S1. DK1 and DK2 denote roof mirror systems. The laser beam can be expanded to a suitable beam diameter by means of a beam expander, not shown, before impinging on the grating. This reduces the laser intensity on the grating (to prevent destruction of the grating surface as the result of intensive laser radiation, etc.). Further, it is ensured in the construction according to the invention that the polarization of the laser radiation on the grating surface is identical in every reflection (in particular, the reflectivity is at maximum when the polarization is vertical to the groove direction of the grating). The arrow indicates the direction in which the retro-reflector DK1 must be displaced via S2 in order to continuously change the total dispersion of the construction. A reduction in the spacing between grating and DK1 results, among other things, in a reduction of the amount of negative dispersion applied to the laser beam by the unit.

By changing the distance of the retro-reflector DK1 from the grating via a control unit S2 or manually, the (negative, etc.) dispersion of the unit according to the invention can be modified continuously. The unit accordingly makes it possible to adapt the chirp of the laser beam to the requirements of the optical system in a simple manner, i.e., by adjusting only one degree of freedom. If the reflector system DK2 is formed as a mirror, a displacement of DK1 is linked with a change in position of the beam out which must be correspondingly readjusted in the fiber input coupling. When the grating G rotates about center of rotation d, an arrangement of this kind can be used without readjusting the position of the beam out.

While the foregoing description and drawings represent the present invention, it will be obvious to those skilled in the art that various changes may be made therein without departing from the true spirit and scope of the present invention.

What is claimed is:

1. A device for coupling in radiation from a short-pulse laser into a beam path of a microscope, comprising that the coupling in is effected by at least one light-conducting fiber following the laser, wherein an optical arrangement is provided between the laser and the at least one light-conducting fiber for changing laser pulses with respect to time in a wavelength-dependent manner, the optical arrangement containing the combination of a diffraction grating, a reflector system and a mirror or the combination of a diffraction grating and two reflector systems, and a laser beam is guided four times by the same diffraction grating.

2. The device according to claim 1, wherein the coupling in is effected in a confocal beam path and an end of the fiber is imaged on an object.

3. The device according to claim 1, wherein the microscope is a laser scanning microscope.

4. The device according to claim 1, wherein the coupling in is effected via at least one monomode fiber.

5. A device for coupling in radiation from a short-pulse laser into a beam path of a microscope, comprising that the coupling in is effected by at least one light-conducting fiber following the laser, wherein an optical arrangement is provided between the laser and the at least one light-conducting fiber for changing laser pulses with respect to time in a wavelength-dependent manner, wherein the optical arrangement includes the combination of only one rotatable diffraction grating, a retro-reflector system and a mirror, or includes the combination of a rotatable diffraction grating and two retro-reflector systems, and a beam is guided four times by the same diffraction grating, and the optical arrangement can be adjusted to a desired laser wavelength merely by rotating the one grating.

6. A device for coupling in radiation from a short-pulse laser into a beam path of a microscope, comprising that the coupling in is effected by at least one light-conducting fiber following the laser, wherein an optical arrangement is provided between the laser and the at least one light-conducting fiber for changing laser pulses with respect to time in a wavelength-dependent manner, wherein the arrangement includes the combination of a diffraction grating, a reflector system and a mirror, wherein a beam is guided four times by the same diffraction grating, and the amount of dispersion is varied by changing a distance between the diffraction grating and the reflector system, or the arrangement includes the combination of a diffraction grating and two reflector systems, and wherein a beam is guided four times by the same diffraction grating, and the amount of dispersion is varied by changing a distance between the diffraction grating and one or both of the reflector systems.

* * * * *